United States Patent
Sohn et al.

(10) Patent No.: US 8,164,024 B2
(45) Date of Patent: Apr. 24, 2012

(54) COMPOSITION OF AMORPHOUS ALLOY AND METHOD FOR FABRICATING THE SAME

(75) Inventors: Kyoung-Sun Sohn, Shenzhen (CN); Xiao-Bo Yuan, Shenzhen (CN); Ho-Do Lee, Shenzhen (CN); Shi-Hun Lee, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 198 days.

(21) Appl. No.: 12/578,557

(22) Filed: Oct. 13, 2009

(65) Prior Publication Data
US 2011/0027609 A1 Feb. 3, 2011

(30) Foreign Application Priority Data
Jul. 31, 2009 (CN) .................. 2009 1 0305067

(51) Int. Cl.
*B23K 26/00* (2006.01)
(52) U.S. Cl. ......... 219/121.64; 219/121.61; 219/121.63; 219/121.84
(58) Field of Classification Search ............. 219/121.64, 219/121.63, 121.84, 121.61; 420/422, 423
See application file for complete search history.

(56) References Cited

U.S. PATENT DOCUMENTS

| 4,560,856 | A  | * | 12/1985 | Miller et al. ............. 219/121.63 |
| 6,582,538 | B1 | * | 6/2003  | Inoue et al. .................... 148/561 |
| 6,771,490 | B2 | * | 8/2004  | Peker et al. ............. 361/679.34 |
| 2005/0271335 | A1 | * | 12/2005 | Yoshikawa ..................... 385/92 |
| 2006/0199661 | A1 | * | 9/2006  | Deng et al. .................... 473/324 |

* cited by examiner

*Primary Examiner* — M. Alexandra Elve
(74) *Attorney, Agent, or Firm* — Altis Law Group, Inc.

(57) ABSTRACT

A method for fabricating a composition of Zr-rich bulk amorphous alloy includes providing a weld member and a base, both made of Zr-rich bulk amorphous alloy, and welding the weld portion of the weld member to the base by a pulsed laser in a protective gas environment. A maximum power of the pulsed laser exceeds or equals 3.5 kW, and a welding rate exceeds 2 mm/sec.

5 Claims, 10 Drawing Sheets

COMPOSITION OF AMORPHOUS ALLOY AND METHOD FOR FABRICATING THE SAME

BACKGROUND

1. Technical Field

The present disclosure relates to a zirconium-rich (hereinafter referred to as Zr-rich) amorphous alloy and, particularly, to a composition of Zr-rich amorphous alloy and method for fabricating the same.

2. Description of the Related Art

It is known that amorphous alloys provide superior magnetic, mechanical, chemical, and other properties in comparison with crystal. Many alloy compositions which can form an amorphous phase, such as Fe systems, Ni systems, Co systems, Al systems, Zr systems, and Ti systems, have been developed.

A plurality of devices or components produced from Zr-rich bulk amorphous alloy, such as golf clubs and solar wind collectors, has been developed. If the composition of the amorphous alloy component is relatively complicated, casting methods of fabrication are ineffective. The amorphous alloy component can be easily fabricated by welding at least two bulk amorphous alloy parts into an integral composition. However, in commonly employed fabrication of the amorphous alloy component, the amorphous state of weld areas of the amorphous alloy component is easily damaged. In addition, a maximum tensile load of the amorphous alloy component fabricated by welding is less than 20 kg, clearly insufficient to satisfy mechanical strength requirements for the component.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
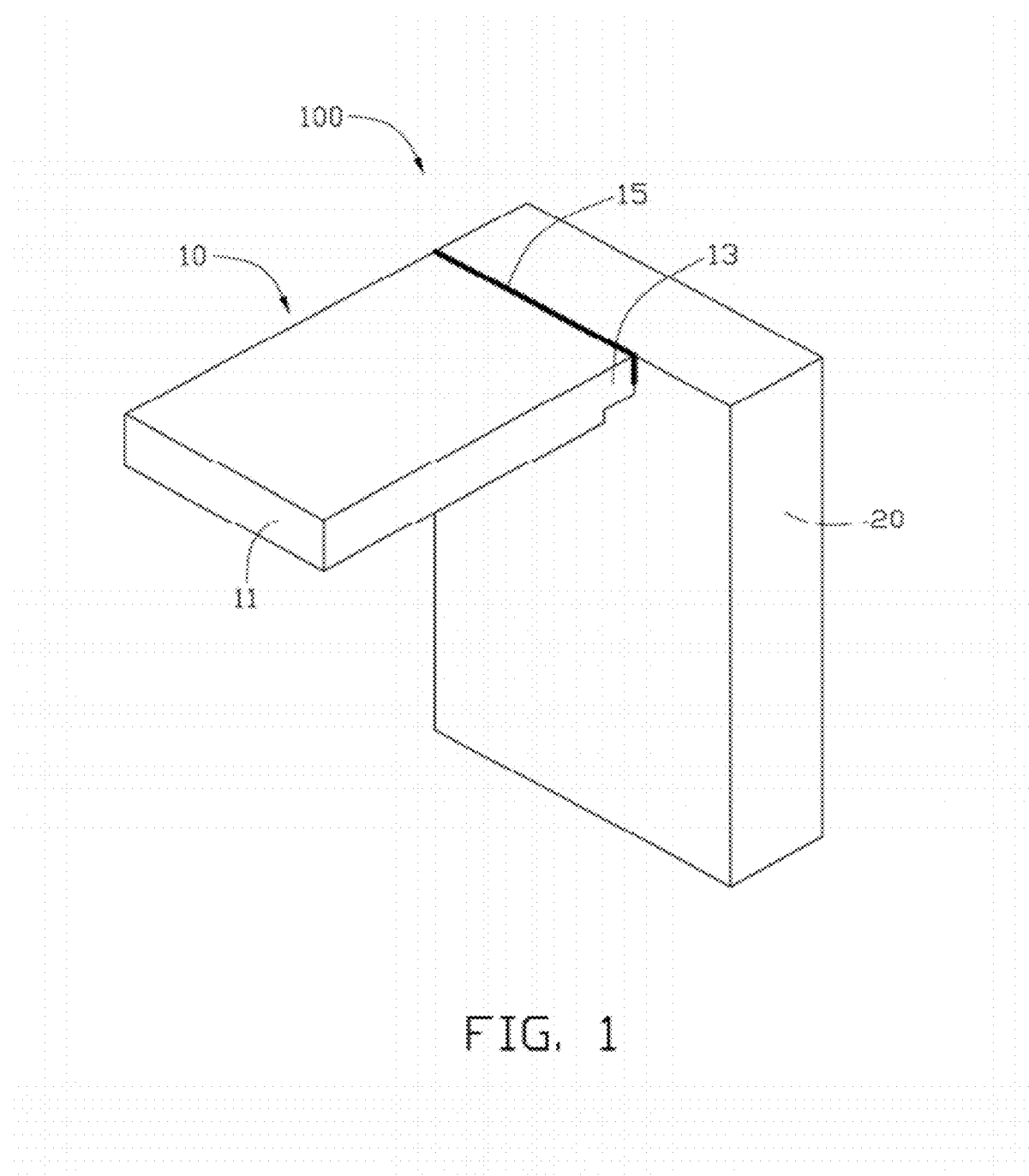
FIG. 1 is an isometric view of a composition of a Zr-rich amorphous alloy.

An embodiment of a composition 100 of a Zr-rich bulk amorphous alloy includes a weld member 10 and a base 20. The weld member 10 includes a main body 11 and a weld portion 13 disposed at an end of the main body 11. A thickness of the weld portion 13 is less than that of the main body 11 of the weld member 10. In the illustrated embodiment, the thickness of the weld portion 13 is from about 0.46 mm to about 1.66 mm. The weld portion 13 of the weld member 10 is welded to the base 20 by a pulsed laser to form a weld area 15. After welding, the weld area 15 is still in an amorphous state. Both the weld member 10 and the base 20 are Zr-rich bulk amorphous alloys, such as, Zr—Cu—Al—Ni, Zr—Cu—Al—Ni—Ti, Zr—Cu—Al—Ni—Nb, Zr—Cu—Ni—Ti—Be, Zr—Cu—Al—Ni—Be, and Zr—Cu—Al—Ti—Be alloys. Alternatively, the weld portion 13 can be thicker than or equal to the main body 11 of the weld member 10.

A method for fabrication of the composition 100 includes providing the weld member 10 and the base 20. The weld portion 13 of the weld member 10 is welded to the base 20 by a pulsed laser in a protective gas environment. The maximum power of the pulsed laser exceeds or equals 3.5 kW, the welding rate is 2 mm/second or more, and the protective gas is Ar, He, or N.

Examples of the composition of the disclosure were tensile tested using a 1220S-type tensile test device produced by still precision device limited company in Dong-guan, China. Test results are as follows.

EXAMPLE 1

Both the weld member 10 and the base 20 were Zr—Cu—Al—Ni—Nb alloys. The thickness of the weld portion 13 of the weld member 10 was about 0.46 mm. The weld portion 13 of the weld member 10 was welded to the base 20 by a pulsed laser in a protective gas condition at a maximum power of about 3.5 kW at a welding rate of about 3.5 mm/sec. After welding, the weld area 15 remained in an amorphous state. The resulting maximum tensile load of the composition 100 was about 25.15 kg.

EXAMPLE 2

Both the weld member 10 and the base 20 were Zr—Cu—Al—Ni—Nb alloys. The thickness of the weld portion 13 of the weld member 10 was about 0.86 mm. The weld portion 13 of the weld member 10 was welded to the base 20 by a pulsed laser in a protective gas condition, at a maximum power of about 3.5 kW at a welding rate of about 3.5 mm/sec. After welding, the weld area 15 remained in an amorphous state. The resulting maximum tensile load of the composition 100 was about 31.53 kg.

EXAMPLE 3

Both the weld member 10 and the base 20 were Zr—Cu—Al—Ni—Nb alloys. The thickness of the weld portion 13 of the weld member 10 was about 1.26 mm. The weld portion 13 of the weld member 10 was welded to the base 20 by a pulsed laser in a protective gas condition at a maximum power of about 3.5 kW at a welding rate of about 3.5 mm/sec. After welding, the weld area 15 remained in an amorphous state. Resulting maximum tensile load of the composition 100 was about 75.22 kg.

EXAMPLE 4

Both the weld member 10 and the base 20 were Zr—Cu—Al—Ni—Nb alloys. The thickness of the weld portion 13 of the weld member 10 was about 1.66 mm. The weld portion 13 of the weld member 10 was welded to the base 20 by a pulsed laser in a protective gas condition at a maximum power of about 3.5 kW and a welding rate of about 3.5 mm/sec. After welding, the weld area 15 remained in an amorphous state. The resulting maximum tensile load of the composition 100 was about 20.77 kg.

EXAMPLE 5

Figure 2:
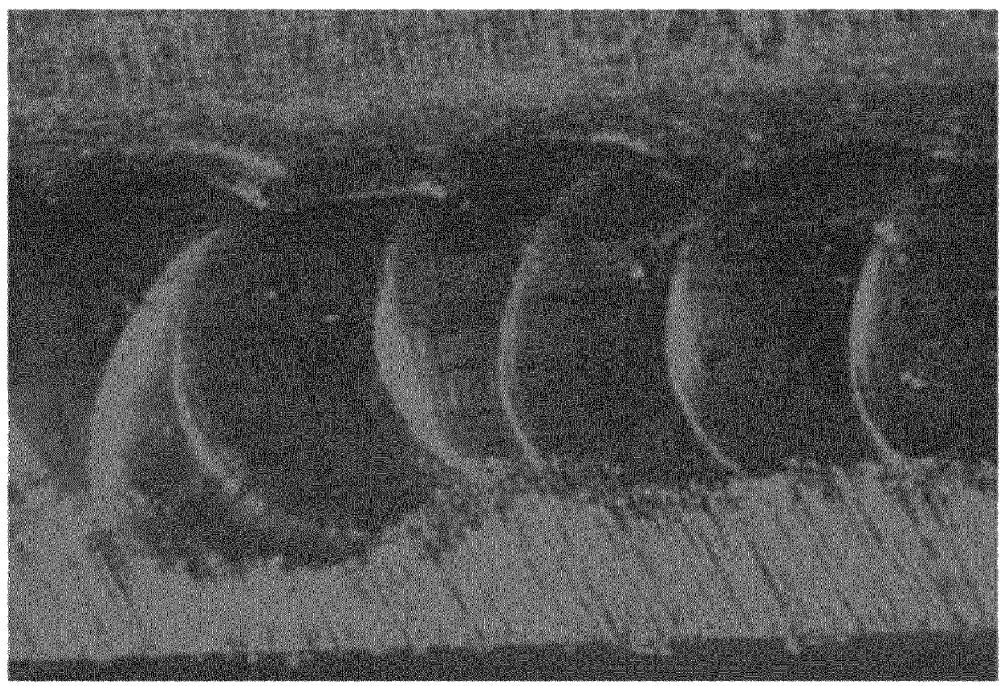
FIG. 2 is a photograph showing the microcomposition in a weld area of example 5 of the composition of FIG. 1.
Figure 3:
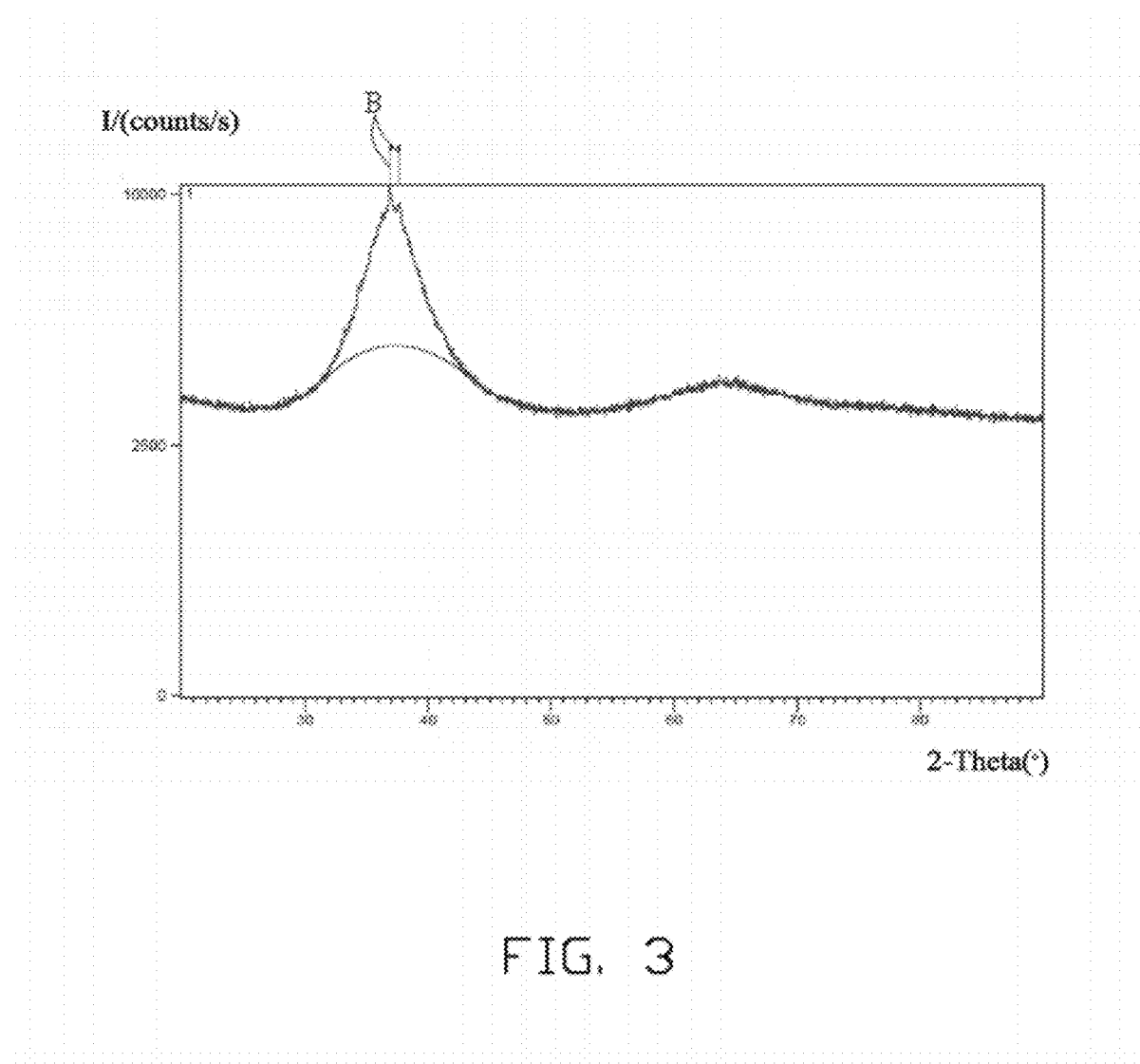
FIG. 3 is an X-ray diffraction graph of a weld area of example 5 of the composition of FIG. 1.

Both the weld member 10 and the base 20 were Zr—Cu—Al—Ni—Nb alloys. The thickness of the weld portion 13 of the weld member 10 was about 0.86 mm. The weld portion 13 of the weld member 10 was welded to the base 20 by a pulsed laser in a protective gas condition at maximum power of about 3 kW and a welding rate of about 2 mm/sec. FIG. 2 shows the micro-composition of the weld area 15 as not being uniform, with a part of thereof having undergone oxidation. FIG. 3 shows two crests B, indicating that a part of the weld area 15 has experienced crystallization.

EXAMPLE 6

Figure 4:
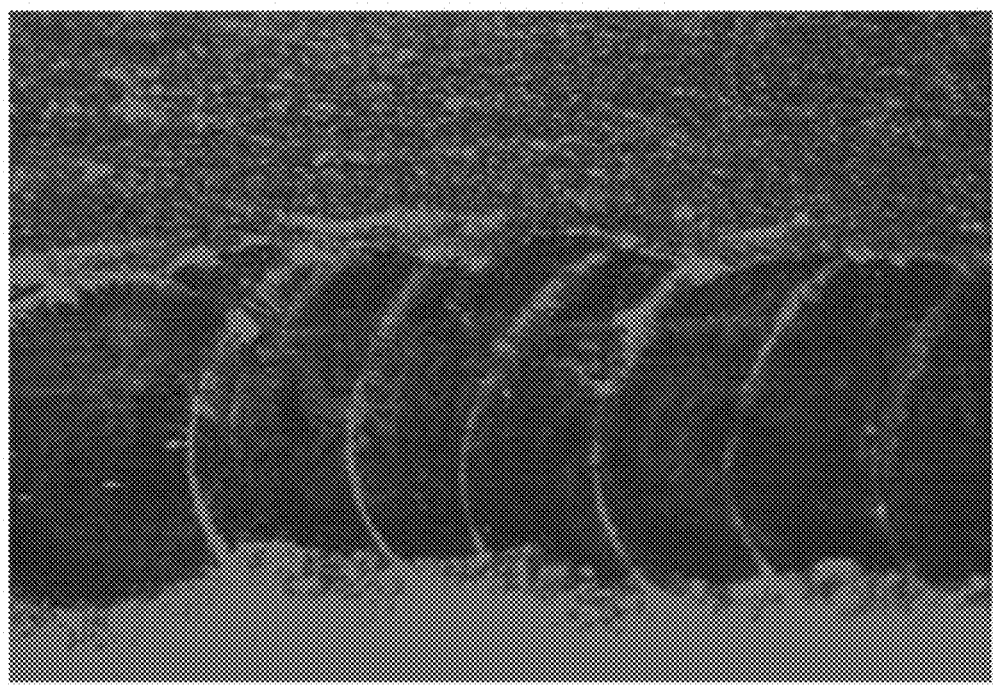
FIG. 4 is a photograph showing the microcomposition in a weld area of example 6 of the composition of FIG. 1.
Figure 5:
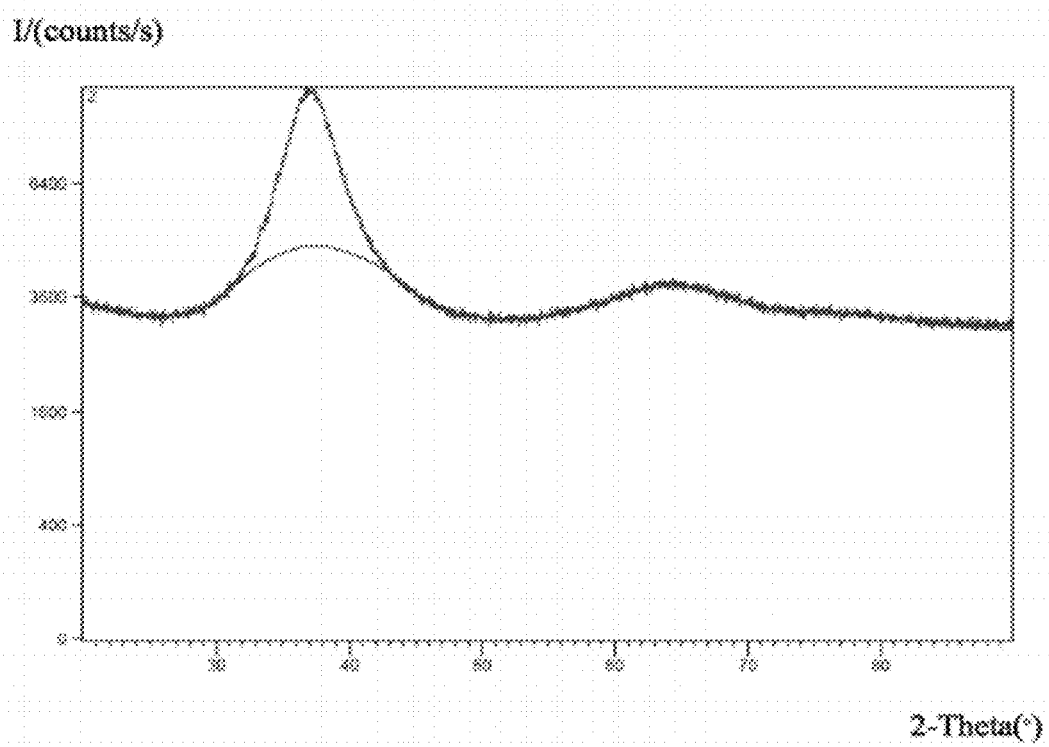
FIG. 5 is an XRD graph of a weld area of example 6 of the composition of FIG. 1.

Both weld member 10 and the base 20 were Zr—Cu—Al—Ni—Nb alloy. Thickness of the weld portion 13 of the weld member 10 was about 0.86 mm. The weld portion 13 of the weld member 10 was welded to the base 20 by a pulsed laser in a protective gas condition at a maximum power of about 3.5 kW and a welding rate of about 3.5 mm/sec. Compared with FIG. 2, micro-composition of the weld area 15 as shown in FIG. 4 is relatively uniform with none of the weld area 15 having undergone oxidation. FIG. 5 shows one scattered crest, indicating that nowhere in the weld area 15 has experienced crystallization.

EXAMPLE 7

Figure 6:
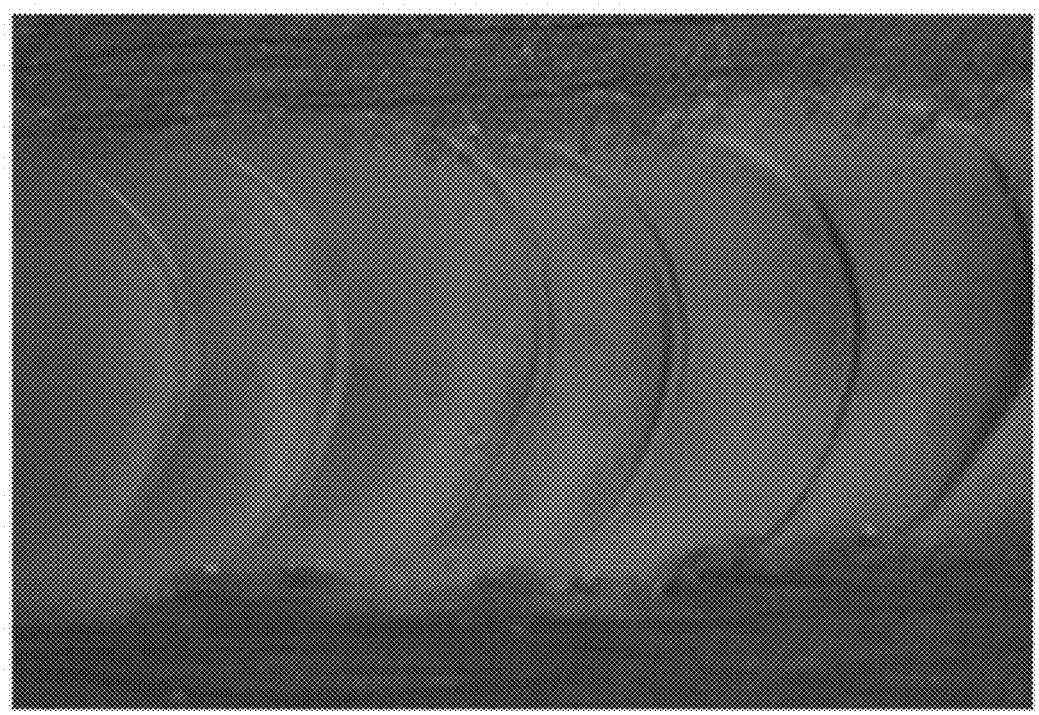
FIG. 6 is a photograph showing the microcomposition in a weld area of the example 7 of the composition of FIG. 1.
Figure 7:
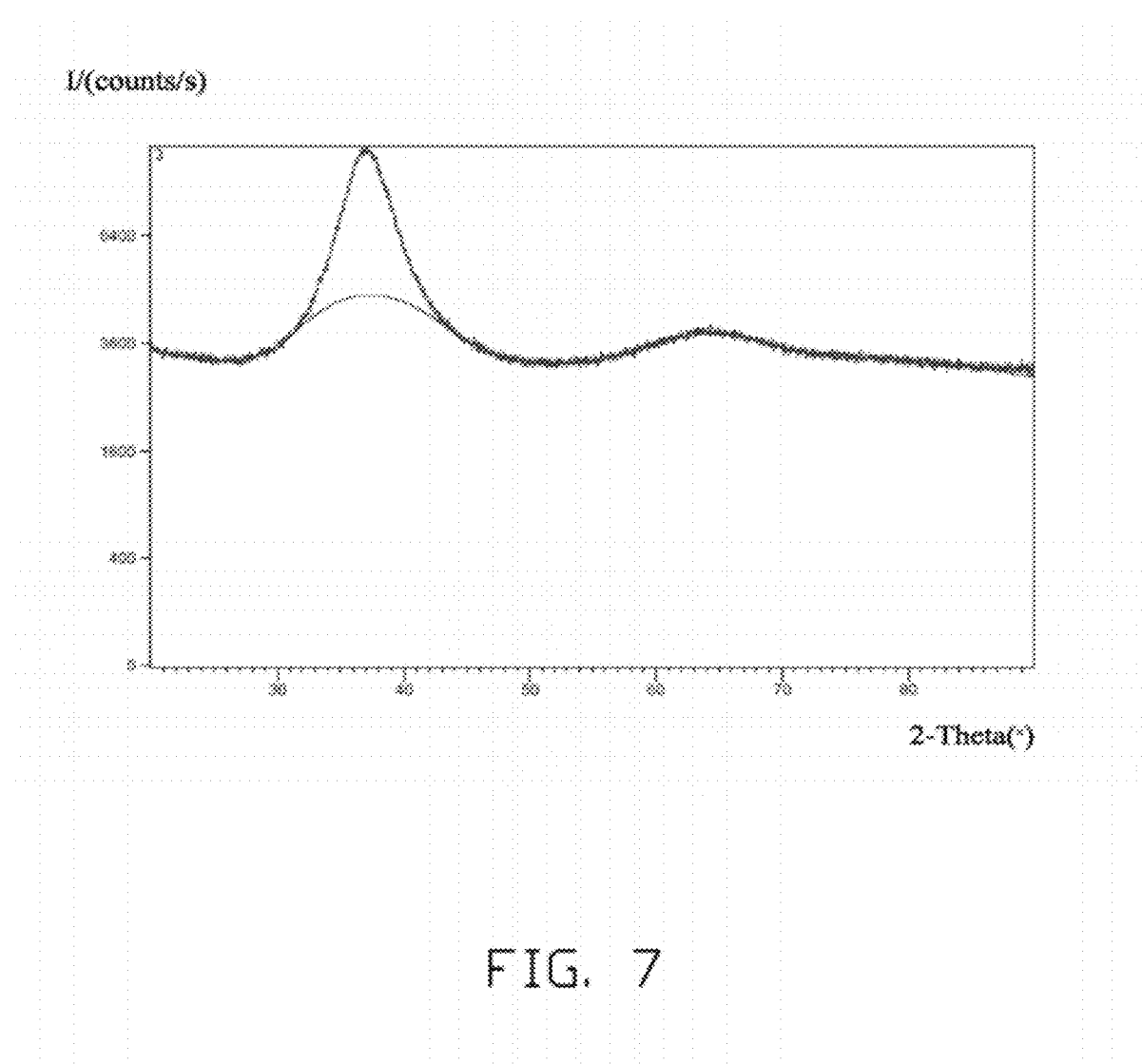
FIG. 7 is an XRD graph of a weld area of example 7 of the composition of FIG. 1.

Both the weld member 10 and the base 20 are made of Zr—Cu—Al—Ni—Nb alloys. Thickness of the weld portion 13 of the weld member 10 is about 0.86 mm. The weld portion 13 of the weld member 10 is welded to the base 20 by a pulsed laser in a protective gas condition at a maximum power of the pulsed laser of about 3.9 kW and a welding rate of about 6 mm/sec. Comparing with the micro-compositions of FIG. 2, micro-compositions of the weld area 15 of FIG. 6 are relatively uniform. None of the weld area 15 of FIG. 6 has undergone oxidation. FIG. 7 shows one scattered crest, indicating that nowhere in the weld area 15 has experienced crystallization.

EXAMPLE 8

Figure 8:
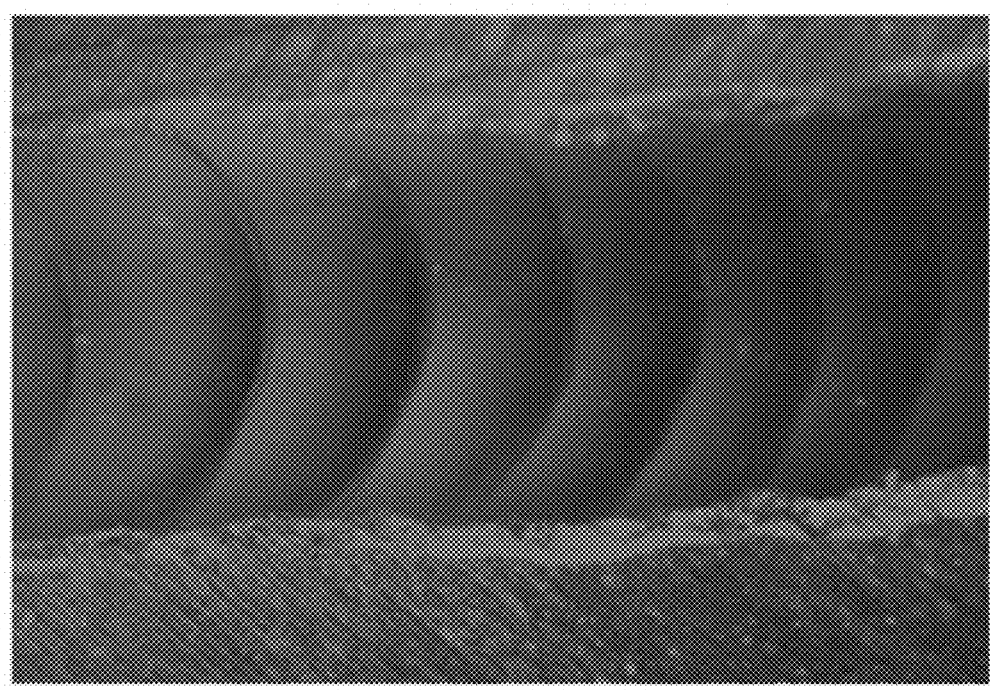
FIG. 8 is a photograph showing the microcomposition in a weld area of example 8 of the composition of FIG. 1.
Figure 9:
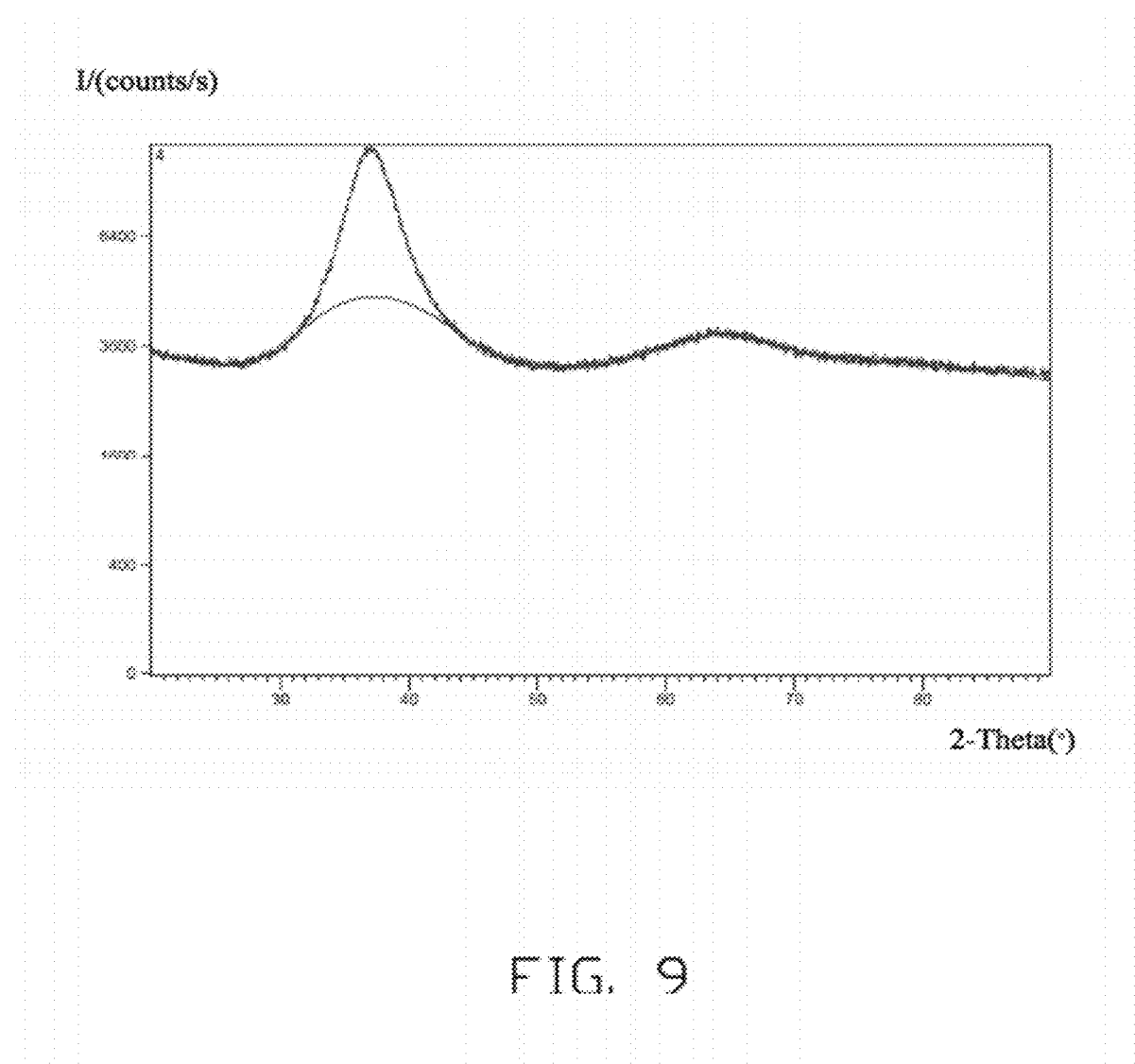
FIG. 9 is an XRD graph of a weld area of example 8 of the composition of FIG. 1.
Figure 10:
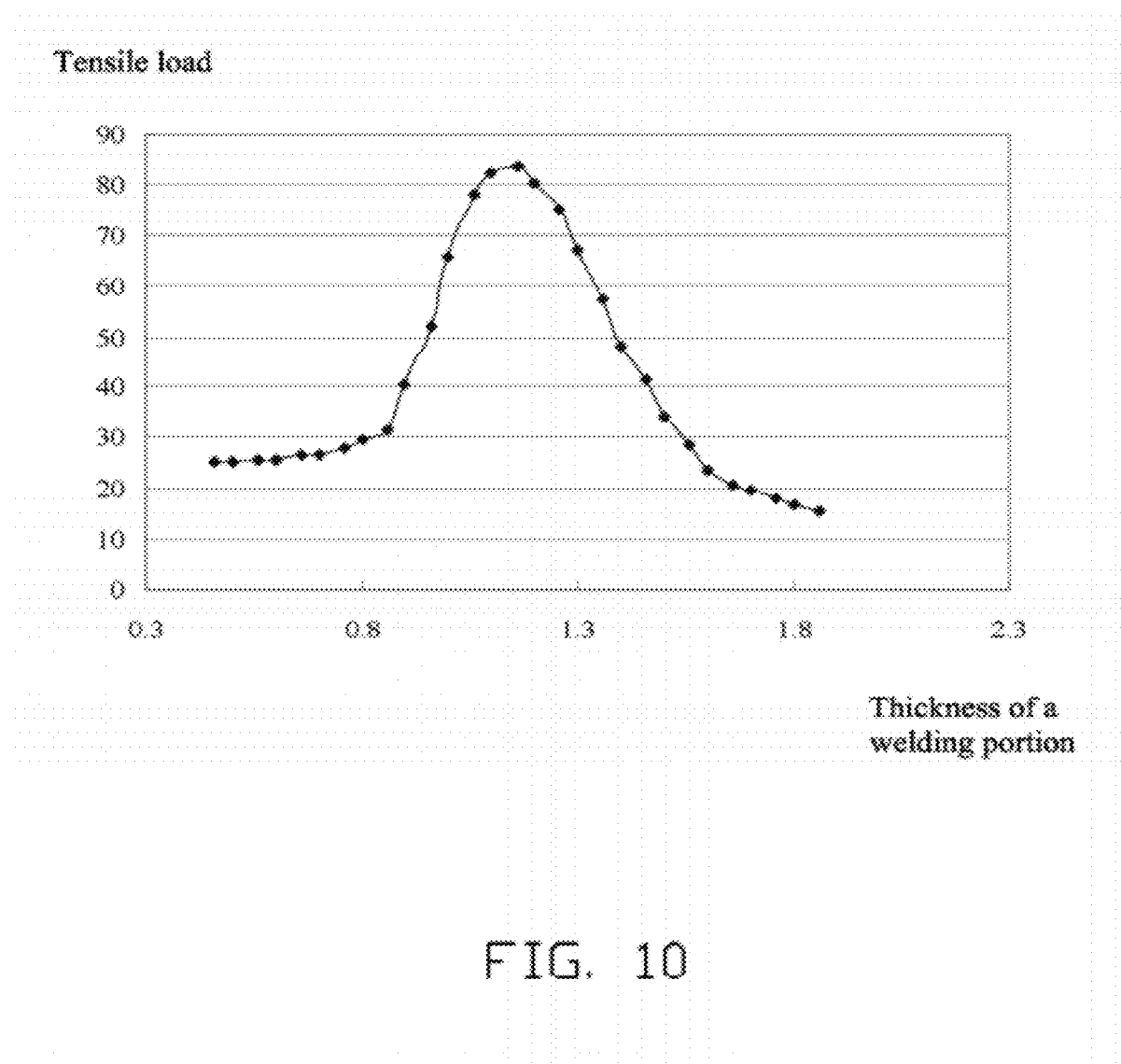
FIG. 10 is a graph of a result of the tensile load of the examples of the composition of FIG. 1.

Both the weld member 10 and the base 20 are made of Zr—Cu—Al—Ni—Nb alloys. The thickness of the weld portion 13 of the weld member 10 is about 0.86 mm. The weld portion 13 of the weld member 10 is welded to the base 20 by a pulsed laser in a protective gas condition at a maximum power of the pulsed laser of about 4.3 kW and a welding rate of about 9.5 mm/sec. Comparing with the micro-compositions of FIG. 2, micro-compositions of the weld area 15 of FIG. 8 are relatively uniform. None of the weld area 15 of FIG. 8 has undergone oxidation. FIG. 9 shows one scattered crest, indicating that nowhere in the weld area 15 has experienced crystallization.

In addition, samples of the compositions underwent testing by a tensile testing device. In the following examples, thicknesses of the weld portions of the weld members of the samples were different, maximum power of the pulsed laser was about 3.5 kW, and welding rate was about 3.5 mm/sec. The tensile test device employed was a 1220S-type tensile test device produced by still precision device limited company in Dong-guan, China. The results are shown in Table 1.

TABLE 1 tensile loads of the samples

| Sample | Thickness of the weld portion (mm) | Maximum tensile load (kg) |
| --- | --- | --- |
| 1 | 0.46 | 25.12 |
| 2 | 0.50 | 25.33 |
| 3 | 0.56 | 25.56 |
| 4 | 0.60 | 25.71 |
| 5 | 0.66 | 26.46 |
| 6 | 0.70 | 26.67 |
| 7 | 0.76 | 27.98 |
| 8 | 0.80 | 29.32 |
| 9 | 0.86 | 31.53 |
| 10 | 0.90 | 40.33 |
| 11 | 0.96 | 52.26 |
| 12 | 1.00 | 65.62 |
| 13 | 1.06 | 78.16 |
| 14 | 1.10 | 82.36 |
| 15 | 1.16 | 83.51 |
| 16 | 1.20 | 80.36 |
| 17 | 1.26 | 75.22 |
| 18 | 1.30 | 66.98 |
| 19 | 1.36 | 57.46 |
| 20 | 1.40 | 48.33 |
| 21 | 1.46 | 41.31 |
| 22 | 1.50 | 34.19 |
| 23 | 1.56 | 28.33 |
| 24 | 1.60 | 23.56 |
| 25 | 1.66 | 20.77 |
| 26 | 1.70 | 19.65 |
| 27 | 1.76 | 18.29 |
| 28 | 1.80 | 16.98 |

As can be seen from Table 1, the maximum tensile load of the weld portion progressively increases with thickness from about 0.46 mm to about 1.16 mm. The maximum tensile load of the weld portion progressively decreases with increased thickness from about 1.16 mm to about 1.80 mm.

It can be concluded that, depending on the requirement of the welding mechanical strength of the composition, the required thickness of the weld portion 13 is about 0.46 mm to about 1.66 mm. In addition, the required maximum power of the pulsed laser exceeds or equals 3.5 kW, and welding rate exceeds 2 mm/sec.

Finally, while the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure as defined by the appended claims.

What is claimed is:
1. A method for fabricating a composition of Zr-rich bulk amorphous alloy, the method comprising:
providing a weld member and a base, both the weld member and the base made of Zr-rich bulk amorphous alloy, the weld member comprising a main body and a weld portion disposed at an end of the main body, a thickness of the weld portion being less than that of the main body; the weld portion having a thickness of about 1.00 mm to about 1.30 mm; and welding the weld portion of the weld member to the base by a pulsed laser in a protective gas environment, wherein a maximum power of the pulsed laser exceeds or equals 3.5 kW, and a welding rate exceeds 2 mm/sec, thereby keeping a welding area of the weld portion and the base in an amorphous state.

2. The method of claim 1, wherein both the weld member and the base are Zr-rich bulk amorphous alloy selected from the group consisting of Zr—Cu—Al—Ni, Zr—Cu—Al—Ni—Ti, Zr—Cu—Al—Ni—Nb, Zr—Cu—Ni—Ti—Be, Zr—Cu—Al—Ni—Be, and Zr—Cu—Al—Ti—Be.

3. The method of claim 1, wherein the maximum power of the pulsed laser is about 3.5 kW to about 4.3 kW.

4. The method of claim 1, wherein a welding rate is about 3.5 mm/sec to about 9.5 mm/sec.

5. The method of claim 1, wherein the protective gas is selected from the group consisting of argon, helium, and nitrogen.

* * * * *